(12) United States Patent
Rogers (10) Patent No.: US 10,092,842 B2
(45) Date of Patent: Oct. 9, 2018

(54) PERSISTENT AUTONOMOUS AGENTS

(71) Applicant: SONY INTERACTIVE ENTERTAINMENT AMERICA LLC, San Mateo, CA (US)

(72) Inventor: Mark Rogers, San Mateo, CA (US)

(73) Assignee: SONY INTERACTIVE ENTERTAINMENT AMERICA LLC, San Mateo, CA (US)

(*) Notice: Subject to any disclaimer, the term of this patent is extended or adjusted under 35 U.S.C. 154(b) by 15 days.

(21) Appl. No.: 15/338,689

(22) Filed: Oct. 31, 2016

(65) Prior Publication Data

US 2017/0182418 A1 Jun. 29, 2017

Related U.S. Application Data

(60) Provisional application No. 62/272,586, filed on Dec. 29, 2015.

(51) Int. Cl.
*A63F 13/58* (2014.01)
*A63F 13/335* (2014.01)
(Continued)

(52) U.S. Cl.
CPC .......... *A63F 13/58* (2014.09); *A63F 13/2145* (2014.09); *A63F 13/335* (2014.09);
(Continued)

(58) Field of Classification Search
CPC ........... A63F 13/58; A63F 13/60; A63F 13/61
See application file for complete search history.

(56) References Cited

U.S. PATENT DOCUMENTS 8,353,767 B1  1/2013 Borst et al.
8,494,981 B2 * 7/2013 Harrison ............... G06N 99/005
                                                            706/12
(Continued)

FOREIGN PATENT DOCUMENTS

JP     2014-111168    6/2014
WO   WO 2017/116566   7/2017

OTHER PUBLICATIONS

PCT/US16/61004, Persistent Autonomous Agents, Nov. 8, 2016.
PCT Application No. PCT/US2016/061004 International Search Report and Written Opinion dated Mar. 3, 2017.

*Primary Examiner* — David Duffy
(74) *Attorney, Agent, or Firm* — Polsinelli LLP

(57) ABSTRACT

The systems and methods are directed towards object driven attributes for characters within a network-based game. More specifically, characters within a network-based game have various attributes that are influenced with the association and/or possession of objects provided by the user. These user-provided objects impact one or more attributes possessed by a character within the network-based game thereby influencing the character's actions, personality and motivations. In other embodiments, the characters within the network-based game communicate with players using a variety of methods such as social media, e-mail and text. The communications provide in-game updates for the player to view. The player can provide natural language commands or responses for the characters that may influence the character's actions within the game.

16 Claims, 6 Drawing Sheets

(51) Int. Cl.
*A63F 13/2145* (2014.01)
*A63F 13/61* (2014.01)
*A63F 13/42* (2014.01)
*A63F 13/60* (2014.01)

(52) U.S. Cl.
CPC .............. *A63F 13/42* (2014.09); *A63F 13/60* (2014.09); *A63F 13/61* (2014.09)

(56) References Cited

U.S. PATENT DOCUMENTS

| | | | |
|---|---|---|---|
| 8,602,876 B2* | 12/2013 | Nakamura | A63F 13/828 463/25 |
| 9,254,442 B2* | 2/2016 | Arakawa | A63F 13/10 |
| 9,364,762 B2* | 6/2016 | Osuna | A63F 13/822 |
| 9,700,796 B2* | 7/2017 | Carpenter | A63F 13/12 |
| 2010/0174593 A1* | 7/2010 | Cao | A63F 13/12 705/14.12 |
| 2011/0086711 A1 | 4/2011 | Dunko et al. | |

* cited by examiner

PERSISTENT AUTONOMOUS AGENTS

CROSS-REFERENCE TO RELATED APPLICATIONS

The present application claims the priority benefit of U.S. provisional application No. 62/272,586 filed Dec. 29, 2015 and entitled "Persistent Autonomous Agents", the disclosure of which is incorporated herein by reference.

BACKGROUND

Field of Invention

The present invention generally relates autonomous agents. More specifically, the present invention relates to systems and methods directed at object driven autonomous agents within network-based games.

Description of the Related Art

A video game is an electronic-based game that involves connecting human interactions with a user interface. Through the use of the user interface, the video game is capable of obtaining user input and generate corresponding visual feedback on a video-based device (e.g., television screen, computer monitor) that can display an image (e.g., two- or three-dimensional) for a player participating in the video game to view. Various user interfaces for use with video games currently exist ranging from personal computers, video game consoles (e.g., Playstation 4) and smartphones.

Video games generally involve human interaction with the user interface whereby the user interface facilitates user control of one or more characters within the video game. Various user interfaces may utilize controllers and peripherals that facilitate the control of the characters within the video game. For example, common controllers may include gamepads, mouses, keyboards, joysticks, touchscreen displays and buttons. Recently, additional methods for character control can be seen using webcams (e.g., Kinect) and motion sensors (e.g, Wii, Wii U).

The video game industry has become an increasing commercial importance. Profits in the video game industry have been seen as driving technological advances that are subsequently used in other industries. For example, the video game industry have been associated with adoption of CD-based storage and software distribution, advancement in 3D graphics technology, advancement in CPU speed, and miniaturization of hardware. Furthermore, the video game industry is one of the largest segments (i.e. third behind broadcast and cable TV) in the U.S. entertainment market.

SUMMARY OF THE CLAIMED INVENTION

A method directed at facilitating communications between in-game characters and the player is presently claimed. The method allows the player to receive, via a user device such as a smartphone, various communications from one or more characters within a game. The communications may be generated based on a triggered event and includes information about the status of the character, information about the triggered event and a request for user input. Upon receipt of the communication, the player may provide a natural language response or command. The response or command is subsequently translated for the in-game character thereby possibly influencing how the character should act.

A method for object driven characters within a game is also claimed. Characters within the game may all have similar or same attributes. Furthermore, these characters act based on their attributes and are not typically controlled by the player. Upon receipt of one or more objects from the player, however, a character's attributes can be modified and/or updated. The player provided objects provide bonuses to various attributes, provide new motivations, alter appearances and grants new or improved abilities. In this way, the player can influence what each character within the game does, despite not having direct control over each character.

Lastly, a method for generated third party content within the game is also claimed. The generated third party content can be provided by various third parties using an application programming interface associated with the game. Third parties can incorporate third party content (e.g., advertisements). Third parties can also generate third party elements to be incorporated within in-game environments. Third party content can then be processed and provided to the players associated with the third party elements once one or more trigger conditions have been fulfilled

BRIEF DESCRIPTION OF THE DRAWINGS

FIG. 4 illustrate example persistent environments that the autonomous agents can be used in along with characters that the autonomous agents may interact with.

DETAILED DESCRIPTION

The present disclosure describes object driven autonomous agents within video games. Generally, characters within video games are controlled by a player via a user interface. Example user interfaces may include joysticks, keypads, controllers and touchscreen displays associated with laptop computers, home consoles (e.g., Playstation 4, Wii U, Xbox One) and smartphones. The characters (i.e. autonomous agents) of the present disclosure, however, are designed to independently operate based on their own programming. In other words, a player does not have direct control (e.g., via a controller) regarding actions being performed by the character. Rather, these autonomous agents are influenced in what they do and their respective motivations based on objects that are provided to each of them. In fact, these autonomous agents can continue performing various tasks in their own respective in-game worlds even while the player is not associated with the game.

The in-game objects that can be used to influence the actions of the autonomous agents may mirror many real-life objects available in the world. Example objects may include axes, pencils, lamps/flashlights, and cameras. It should be noted that many more objects are possible. Through the use of these objects, a player can indirectly control these autonomous agents since each of these objections would have some known characteristic associated with the object. Furthermore, based on the assigned object, a particular autonomous agent may be bestowed with one or more unique abilities associated with the object. For example, an ax may correspond to characteristics whereby the wielder would have increased physical strength as well as motivations to go find and chop down trees in order to collect lumber. Another example may be the use of a pick-ax whereby the wielder may similarly have increased physical strength but would have motivations this time to journey into caves and mine for valuable minerals. Another object, such as a pencil, may be associated with increase intellect and provide motivations for the autonomous agents to record notes about certain events or draw (i.e. maps).

With the combination of multiple objects, a player may be capable of indirectly controlling one or more autonomous agents within an environment associated with a network-based game. Based on the combinations of multiple objects, each autonomous agent may be influenced differently and may possess different statistics, characteristics, motivations and capabilities. Further details regarding the scope of the present invention will be described in greater detail below.

Figure 1:
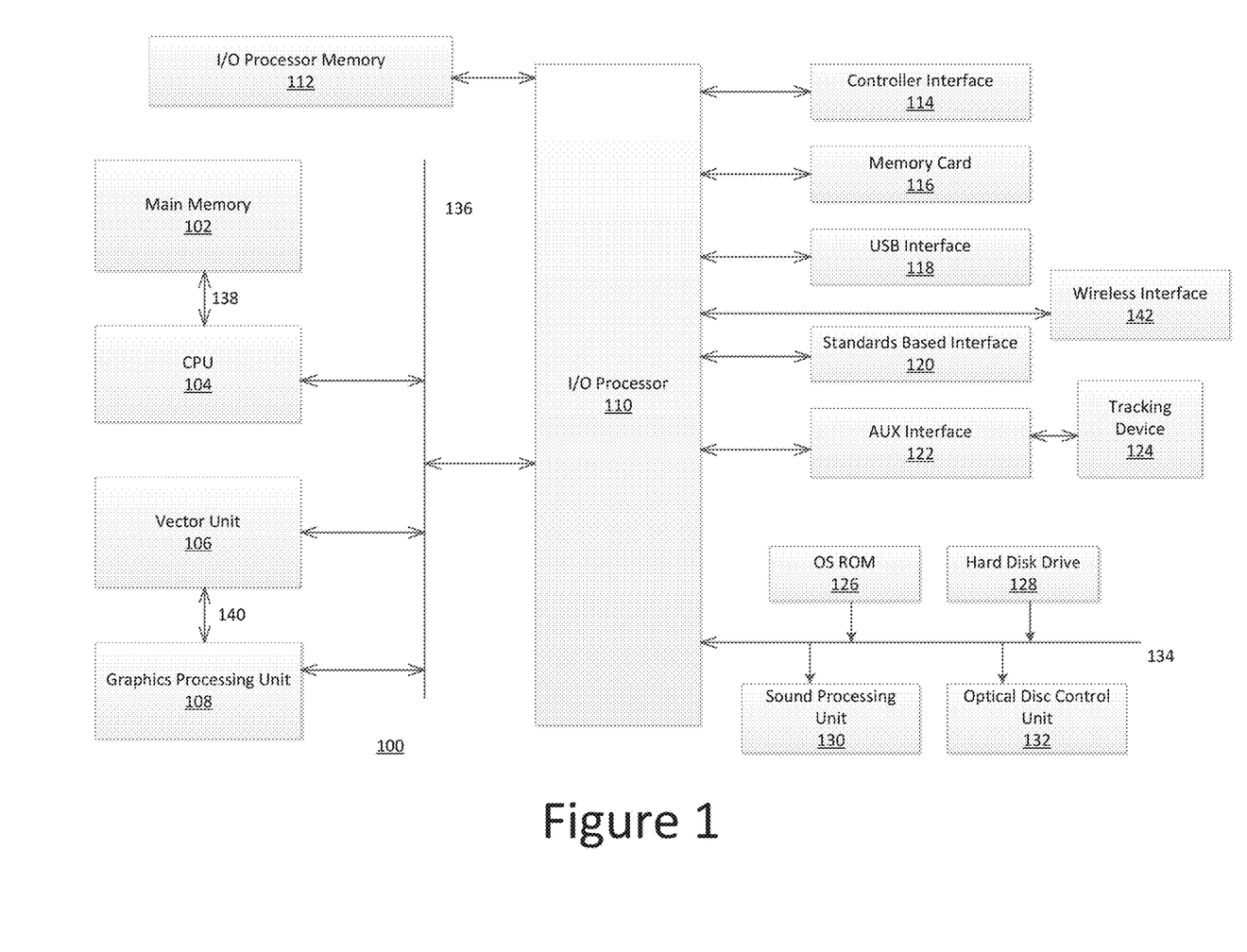
FIG. 1 is a block diagram of an exemplary electronic entertainment system.

FIG. 1 is a block diagram of an exemplary electronic entertainment system 100. The exemplary electronic entertainment system 100 may be incorporated into a user client device (e.g., desktop, laptop, tablet, mobile device, console gaming system) that the user can utilize to facilitate carrying out features of the present invention pertaining to the persistent autonomous agents.

The entertainment system 100 may include various elements as illustrated in FIG. 1. It should be noted that the elements are exemplary and that other embodiments may incorporate more or less than the elements illustrated. With reference to FIG. 1, the entertainment system 100 includes a variety of elements known in the art including main memory 102, a central processing unit (CPU) 104, at least one vector unit 106, a graphics processing unit 108, an input/output (I/O) processor 110, an I/O processor memory 112, a controller interface 114, a memory card 116, a Universal Serial Bus (USB) interface 118, and a Standards Based interface 120 facilitating any standards related connection, an auxiliary (AUX) interface 122 for connecting, for example, a tracking device 124, although other bus standards and interfaces may also be utilized. The entertainment system 100 can also further include an operating system read-only memory (OS ROM) 126, a sound processing unit 128, an optical disc control unit 130, and a hard disc drive 132, which are connected via a bus 134 to the I/O processor 110.

It should be noted that in some embodiments, the entertainment system 100 may also contain a wireless interface 142. The wireless interface 142 may be an 802.xx wireless based interface or any other wireless interface recognized by various wireless standard setting organizations. The wireless interface 142 facilitates interactions between the various peripherals, data stores, data sources, data destinations, or other transmitting and receiving devices that might interact with the entertainment system of FIG. 1.

In some embodiments, the entertainment system 100 further includes at least one tracking device 124. The tracking device 124 may be a camera, which includes eye-tracking capabilities. The camera may be integrated into or attached as a peripheral device to entertainment system 100. In typical eye-tracking devices, infrared non-collimated light is reflected from the eye and sensed by a camera or optical sensor. The information is then analyzed to extract eye rotation from changes in reflections. Camera-based trackers focus on one or both eyes and record their movement as the viewer looks at some type of stimulus. Camera-based eye trackers use the center of the pupil and light to create corneal reflections (CRs). The vector between the pupil center and the CR can be used to compute the point of regard on surface or the gaze direction. A simple calibration procedure of the viewer is usually needed before using the eye tracker.

Alternatively, more sensitive trackers use reflections from the front of the cornea and that back of the lens of the eye as features to track over time. Even more sensitive trackers image features from inside the eye, including retinal blood vessels, and follow these features as the eye rotates.

Most eye tracking devices use a sampling rate of at least 30 Hz, although 50/60 Hz is most common. Some tracking devises run as high as 1250 Hz, which is needed to capture detail of very rapid eye movement.

A range camera may instead be used with the present invention to capture gestures made by the user and is capable of facial recognition. A range camera is typically used to capture and interpret specific gestures, which allows a hands-free control of an entertainment system. This technology may use an infrared projector, a camera, a depth sensor, and a microchip to track the movement of objects and individuals in three dimensions. This system employs a variant of image-based three-dimensional reconstruction.

The tracking device 124 may include a microphone integrated into or attached as a peripheral device to entertainment system 100 that captures voice data. The microphone may conduct acoustic source localization and/or ambient noise suppression.

Alternatively, tracking device 124 may be the controller of the entertainment system. The controller may use a combination of built-in accelerometers and infrared detection to sense its position in 3D space when pointed at the LEDs in a sensor nearby, attached to, or integrated into the console of the entertainment system. This design allows users to control a game with physical gestures as well as button-presses. The controller connects to the console using wireless technology that allows data exchange over short distances (e.g., 30 feet). The controller may additionally include a "rumble" feature (i.e., a shaking of the controller during certain points in the game) and/or an internal speaker.

The controller may additionally or alternatively be designed to capture biometric readings using sensors in the remote to record data including, for example, skin moisture, heart rhythm, and muscle movement.

As noted above, the entertainment system 100 may be an electronic gaming console. Alternatively, the entertainment system 100 may be implemented as a general-purpose computer, a set-top box, or a hand-held gaming device. Further, similar entertainment systems may contain more or less operating components.

The CPU 104, the vector unit 106, the graphics processing unit 108, and the I/O processor 110 communicate via a system bus 136. Further, the CPU 104 communicates with the main memory 102 via a dedicated bus 138, while the vector unit 106 and the graphics processing unit 108 may communicate through a dedicated bus 140. The CPU 104 executes programs stored in the OS ROM 126 and the main memory 102. The main memory 102 may contain pre-stored programs and programs transferred through the I/O Processor 110 from a CD-ROM, DVD-ROM, or other optical disc (not shown) using the optical disc control unit 132. The I/O processor 110 primarily controls data exchanges between the various devices of the entertainment system 100 including the CPU 104, the vector unit 106, the graphics processing unit 108, and the controller interface 114.

The graphics processing unit 108 executes graphics instructions received from the CPU 104 and the vector unit 106 to produce images for display on a display device (not shown). For example, the vector unit 106 may transform objects from three-dimensional coordinates to two-dimensional coordinates, and send the two-dimensional coordinates to the graphics processing unit 108. Furthermore, the sound processing unit 130 executes instructions to produce sound signals that are outputted to an audio device such as speakers (not shown).

A user of the entertainment system 100 provides instructions via the controller interface 114 to the CPU 104. For example, the user may instruct the CPU 104 to store certain game information on the memory card 116 or instruct a character in a game to perform some specified action.

Other devices may be connected to the entertainment system 100 via the USB interface 118, the Standards Based interface 120, and the AUX interface 122. Specifically, a tracking device 124, including a camera or a sensor may be connected to the entertainment system 100 via the AUX interface 122, while a controller may be connected via the USB interface 118.

Figure 2:
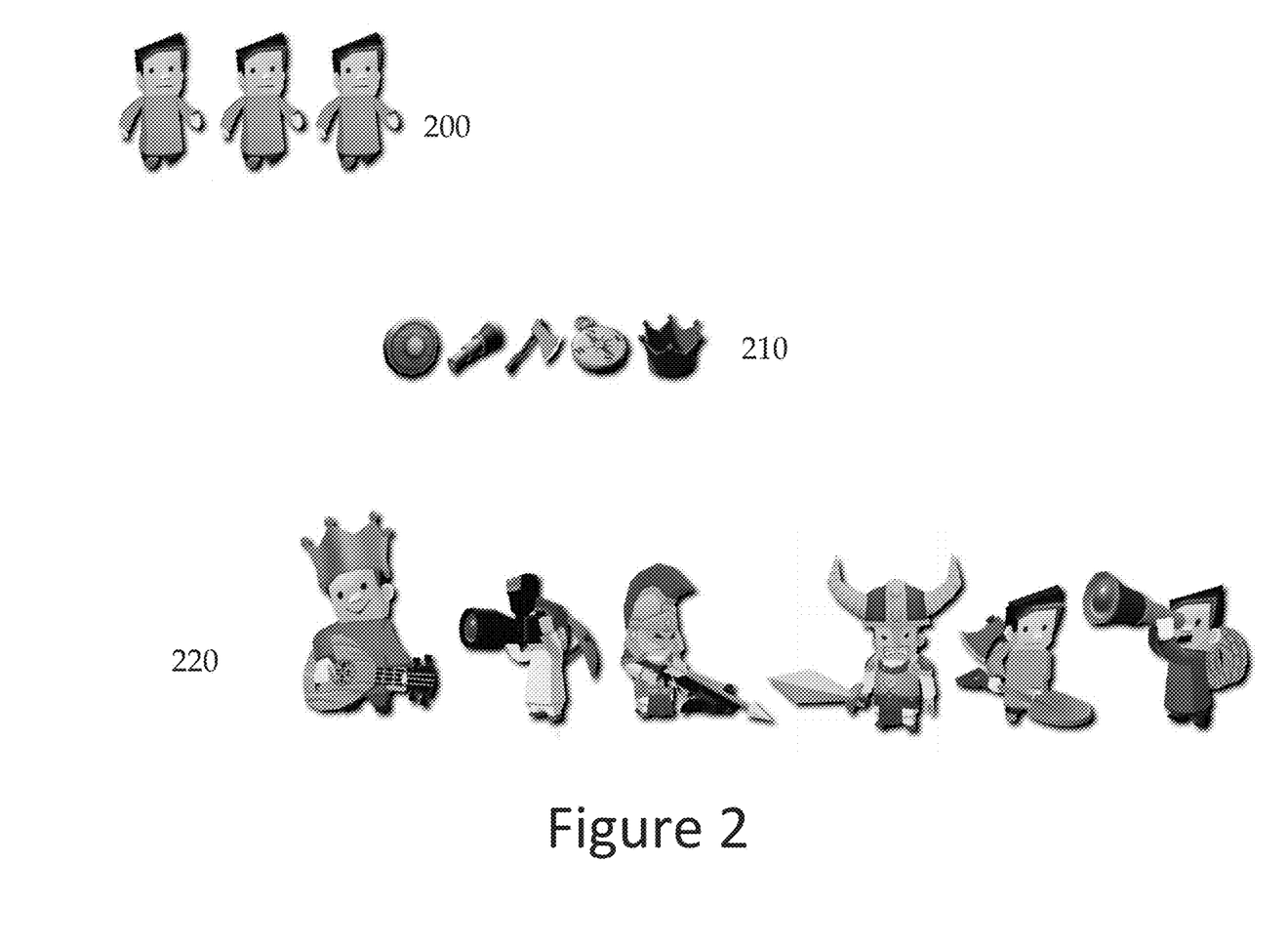
FIG. 2 illustrates embodiments of autonomous agents 200 and objects 210 that can be provided to the autonomous agents to drive their actions and behaviors.

FIG. 2 illustrates embodiments of autonomous agents 200 and objects 210 that can be provided to the autonomous agents to drive their actions and behaviors. These autonomous agents 200, which exist within a persistent world (run on a server or in the cloud), may all possess similar or exactly the same baseline statistics. In other words, there may be little to no difference between different autonomous agents 200. This may correspond with each autonomous agent having similar characteristics, motivations, statistics, abilities and programming indicating what a particular autonomous agent 200 is capable of doing. The characteristics, motivations, statistics, abilities and programming used to dictate the actions of each autonomous agent 200 may be stored in memory. For example, the memory used to store such information may be associated with the server that corresponds with the persistent world that the autonomous agent 200 exists in. In other embodiments, the information may be stored in a separate database and organized based on player ownership.

As referred to herein, characteristics refer to various attributes that may be possessed by the autonomous agents. For example, strength, agility, intelligence and stamina may be characteristics that each autonomous agent can possess. Statistics refer to numerical values that quantify different attributes for the autonomous agent. Typically in games, the higher the numerical value assigned to a particular characteristic, the better that characteristic is for that autonomous agent. With respect to abilities, this refers to what actions the autonomous agent may be capable of performing within the game. For example, once an autonomous agent is provided with an object (e.g., ax), the autonomous agent would be capable of performing various objects (e.g., chopping woods) using that provided object. Lastly, motivations can refer to an inherent tendency that the autonomous agent may be prone to perform. Some objects may provide an autonomous agent with a motivation. For example, an ax may provide an autonomous agent with a tendency to find and chop down all available trees in order to gather wood for the player.

The above explanations for these terms are exemplary ways that the autonomous agent can be influenced by player provided objects. There may be other ways in which objects can influence autonomous agents.

The objects 210, as illustrated in the figure, are what are used to influence the differences between various autonomous agents. In other video games, a player may be capable of directly controlling/instructing a character in-game to perform a particular task or improve various characteristics. Such controlling and instructing can be carried out, for example, via a controller. The autonomous agents 200 of the presently claimed invention, however, are not controlled or instructed in this way. Rather, the player is able to influence a particular autonomous agent's motivation, growth and abilities (see 120) through providing one or more objects 210. By providing an autonomous agent 200 with at least one object 210, data associated with the object 210 can be incorporated into data associated with the particular autonomous agent 200.

The objects 210 may resemble objects known in the present world. With each object, various data can be associated with it so that providing the object to an autonomous agent 200 influences changes, for example, in the motivation, growth and abilities of the particular autonomous agent. These objects may have preset affects that are stored in a database. The database may be accessible by players so that the player can read and understand the effects of providing a particular object to an autonomous agent.

The objects 210 that can be used by the player can be obtained in various ways. These objects 210 may already exist within the game whereby the player has access to them at the start of the game. In other embodiments, some objects may be given as a reward for completion of a task. In some embodiments, objects 210 may be crafted/constructed from raw materials (i.e. wood, metal and stone). In some further embodiments, some objects may be obtained/purchased as items in the real world associated for use within the game (e.g., Skylanders). Once obtained/purchased, the player may associate the object with the corresponding game (e.g., via gaming console) and use the object accordingly.

These objects 210 may include physical items such as swords, axes, and shield. With an ax, for example, information associated with the item may be stored in a database that indicates special characteristics tied to the object 210. For example, an autonomous agent using an ax may experience growth in physical strength as the autonomous agent continually uses the ax. Alternatively, as the autonomous agent has the ax in their possession, the autonomous agent can also experience growth in physical strength.

Furthermore, the autonomous agent may be provided a motivation or instruction to search out trees in order to chop the trees down to gather lumber (i.e. lumberjack). To assist in the provided motivation or instruction, the autonomous agent may obtain various passive skills (i.e. knowledge to identify trees) or active skills (i.e. chopping skill) that allow the agent to find appropriate trees and chop them down.

Different objects 210 may also share similar effects if their functionality is deemed similar. For example, in some embodiments, some available objects may include a torch, lantern, and flashlight. These items all share a commonality that they are all useful as being light sources. In this way, objects that appear to be different can be classified into categories so that all these objects falling into the same category can have the same effect. Similarly, with respect to the example of the ax, different types of axes (i.e. broad ax, battle ax) may be available as objects that can be provided to an autonomous agent. In some embodiments, differences between similar items (i.e. light sources) can also be provided, for example, distinguishing as to how each object is constructed from materials, regarding durability of the object (i.e. flashlight may be more durable than a torch) or functionality (i.e. flashlights may be resistant to wind and rain compared to torches).

As in the example of the ax, some effects may be logically consistent with the use of the object. For example, continued physical use of the ax can result in increased efficiency with the ax whereby the user becomes physically stronger or more efficient at obtaining lumber. In some cases, some effects may not be logically consistent but may be based on the videogame. For example, continued wood gathering with an ax may unlock hidden skills/efficiency with axes when used in combat.

The objects 210 that can be provided to autonomous agents 200 may also include concepts placed into a physical form. For example, such a conceptual object may include a heart that represents bravery. Another conceptual object can also include a crown that represents authority. These conceptual objects 210 would also provide motivations, characteristics and abilities similar to physical objects (e.g., ax) described above. For example, by providing a heart to an autonomous agent 200, the autonomous agent 200 may be provided a motivation to explore more with characteristics of being more brave and adventurous. This added characteristic of bravery may be capable of instilling similar motivations to surrounding autonomous agents 200 in a similar manner as how brave individuals in our real life may inspire others around them.

In embodiments when an autonomous agent 200 is provided one or more objects 210, not only may the autonomous agent 200 appear to be carrying the object, but the provided objects 210 may also alter the physical appearance of the autonomous agent 200 to indicate that some change has occurred due to the object(s) provided. As illustrated in FIG. 2, some example alterations 220 are shown. These alterations may reflect a role that corresponds with the object that they have been provided. For example, an autonomous agent 200 wielding an ax to collect wood may now be dressed up like a lumberjack. In this way, all autonomous agents 200 that are dressed up in lumberjack apparel may be easily identified as those that will go and collect wood. The change in physical appearance may be used to more easily dictate to the player which autonomous agent has what object(s). The change in physical appearance for the autonomous agent may, in some cases, provide no additional benefit.

However, there may be embodiments, where the change in physical appearance may produce enhanced benefit and correspond to conditions such as once an agent has become highly proficient at a task. The change in appearance may similarly indicate a progress that the particular autonomous agent has undergone so that a player can more easily identify motivations, characteristics and/or skills available to that particular autonomous agent.

Information about a particular object (i.e. ax, heart) may be stored within a database. The database containing the information for the object 210 may be updated, for example, by the developer or third party to modify existing object-based information. In some embodiments, the developer or third party can introduce new objects into the database for use within a game.

In an embodiment, a company (e.g., Coca Cola, McDonalds) can seek to introduce advertising within the game by incorporating branded products (e.g., soda, hamburgers) for use with the game. Such branded products used as objects may have similar functionalities as other objects within the same category (i.e. food). However, these branded products can also be provided additional benefits in order to distinguish and/or encourage players to obtain and use the branded product from other objects already existing within the game.

The database may contain various other data for other objects 210 that may be compatible with the autonomous agent 200 but the player does not have access to. Since the effect that an object 210 has on an autonomous agent may differ between different games, upon player selection of an object 210, the game itself may search for and retrieve the corresponding information associated with the selected object.

Once an item has been selected and provided to a particular autonomous agent, the game may then identify the particular autonomous agent and modify the existing motivation, characteristic and/or abilities based on the selected object. This may involve overwriting or modifying existing motivations, characteristics and/or abilities assigned to the particular agent. As noted above, the information about each autonomous agent may be stored in memory associated with the game where the autonomous agent resides in. In some embodiments, the information about each autonomous agent may be stored in a separate memory (i.e. server). This modification to the autonomous agent's motivation, characteristic and/or abilities translates into how the autonomous agent acts and behaves within the game. This can be viewed as an alternative way of controlling a character through the use of an object (as opposed to instructions from a controller).

Although the above embodiments describe situations where a particular autonomous agent is provided one object that influences the motivation, characteristics and/or abilities of the autonomous agent within the game, it may be possible that each autonomous agent is capable of possessing any number of objects (i.e. finite or infinite). Combinations of different objects may be used to provide capabilities that would not have been normally possible using only one object or through using two separate autonomous agents each with one object each. Upon providing a recognized combination of objects (possibly associated with a particular task), the autonomous agent may be allowed to complete a task.

As an example, suppose the game requires that minerals be obtained from within an underground mine. The task may require that a pickax be used to obtain minerals from rocks from within the mine. Furthermore, since the mine may not be lit, a light source may be required so that an autonomous agent can navigate the passages and see where it is going. Lastly, some form of protection may be needed to protect the autonomous agent from falling debris. The game may know what items (or similar items) may be used to fulfill the requirements.

In order to address this obstacle, a player may provide an autonomous agent with a hard hat, pick ax and a lantern in order to allow that autonomous agent the ability to excavate a mine. The hardhat could provide protection from falling debris in the mine, the pick ax allows the autonomous agent to obtain minerals from within the mine and the lantern allows the autonomous agent to see and navigate underground. Once the satisfactory items have been provided, the autonomous agent may automatically perform the task of obtaining minerals from the underground mine. However, if the agent is not provided all the items, the autonomous agent may not be successful in completing the task or, in some cases, may not be capable of performing the task at all.

Figure 3:
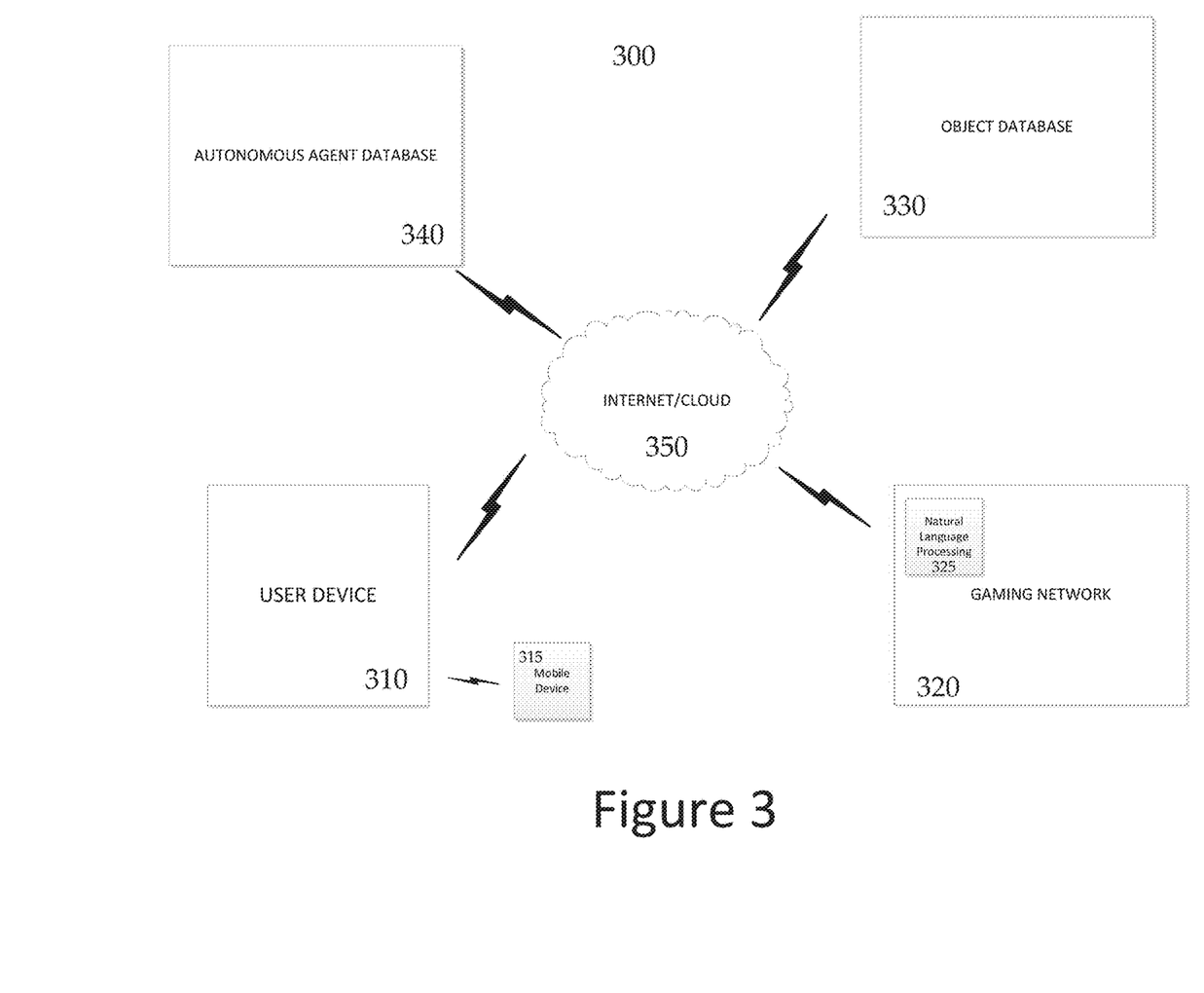
FIG. 3 is an exemplary system for implementing the object driven autonomous agents.

FIG. 3 is an exemplary system 300 for implementing the object driven autonomous agents. The system 300 includes a user device 310 whereby a user (i.e. player) connects with a gaming network 320 that uses the autonomous agents. The system 300 also includes a database 330 that stores information regarding the various objects that can be used with the autonomous agents as well as a database 340 that stores information regarding the various autonomous agents. In some embodiments, the object database 330 and autonomous agents database 340 may be stored within the same database or even within a database associated with the gaming network 320. Further details regarding the elements of the system 300 are provided below.

The user device 310 may include any computing device that allows the player to connect to the gaming network 320. For example, exemplary user devices 310 may include smartphones, gaming consoles (e.g., Playstation 4), laptops, desktops and tablets. The player may be allowed to connect to the gaming network 320 using multiple user devices 310 (i.e. cross-platform compatibilities). Similarly, different players may be capable of accessing the same content within the gaming network 320 using different user devices 310.

The gaming network 320 may be run in the cloud/Internet 350. In some embodiments, the gaming network 320 may be associated with one or more processors and servers that allows video games associated with the gaming network 320 to be run. The gaming network 320 may have one or more associated video games. For example, a gaming company may have and manage a gaming network 320 in order to run their own respective video games.

The gaming network 320 allows games to implement a persistent environment or world. The persistent environment pertains to a game that continues to exist and operate even when no players are interacting with the game. In this way, players can enter and leave the gaming network 320 whenever they would like. While the player is not connected to the environment or world, the autonomous agents owned by the player would still continue to perform whatever tasks they were planning on.

In some embodiments, the gaming network 320 may also include, for example, natural language processing module 325 that facilitates communication between the autonomous agents and the player. The natural language processing module 325 can analyze and translate statements provided by the player via their mobile device 315 (e.g., text messages from their smartphone) into commands that can be understood by one or more autonomous agents within the gaming network 320. Similarly, the information from the autonomous agents from within the gaming network 320 can be translated into speech that can be understood by the player using their own personal device, for example, a mobile device 315 (e.g., smartphone). Additional details regarding the communication between the autonomous agents from within the gaming network 320 and the user via their mobile device 315 is provided below in FIG. 6.

The object database 330 includes information related to the various objects that may be provided to the autonomous agents within the gaming network 320. The object database 330 may include information for all the various objects (e.g., within a table) so that the gaming network 320 would be capable of retrieving information about a particular object if the object is provided to an autonomous agent within the game. The information with respect to each various object stored within the object database 330 may also depend on the game that the object is being used within the gaming network 320. It may be possible that the same object can have two different effects in two different games on the gaming network 320 or across different gaming networks 320. For example, if the player provides an autonomous agent with a shovel, the gaming network 320 can request information about the characteristics associated with the shovel within the object database 330 with respect to a current game that the autonomous agent is currently participating in. Using the information retrieved from the object database 330, the gaming network 320 can then alter the characteristics of the autonomous agent accordingly such as changing the physical appearance of the autonomous agent and modifying statistics and abilities of the autonomous agent.

The object database 330 may be populated and/or managed by the owner of the object database 330 such as the maker/developer of the objects and/or gaming network. This allows the object database 330 to be constantly updated with the presence of new objects that may be available over time (i.e. a company releases new objects that are now compatible with the gaming network 320).

There may be situations where a player provides an object that is not compatible with the current gaming network 320 (i.e. objects from other video games). When the gaming network 320 determines that an object is incompatible, which may correspond with no information being retrievable from the object database 330, notification can be provided to the player that such an item is not compatible and no further action is performed on the autonomous agent.

It may be possible that the gaming network 320 and/or object database 330 can update the available information stored in the object database 330 with the incompatible object provided by the player. For example, the gaming network 320 may request the player to input information about what the object may be most similar to since there may be already existing objects that are similar in nature but look different (e.g., torch, lamp, flashlight). In other embodiments, the gaming network 320 may request the player to input customized information for the incompatible object so that the object can be further included into the object database 330. With these ways, objects that are not currently within the object database 330 may be included so that more objects can be provided to the autonomous agent. To control the types of information that is stored in the gaming network 320 (e.g., to ensure that the information stored with each object is appropriate), there may be implemented a process (e.g., administrator supervision) that reviews the player submitted information. Based on the process, the player submitted information can be stored within the object database 330 so that other players can later utilize that new object. Alternatively, the player submitted information can be discarded. Such overview can ensure that inappropriate information is not stored and used with the gaming network, for example, to maintain balance and expectation with all the objects usable within the gaming network.

The possibility of player input with the object database 330 can also allow third parties (e.g., Coca-Cola) the ability to incorporate their own products (e.g., soft drinks) within the gaming network 320 (e.g., product placement). The third parties, presuming they have permission with the gaming network 320 and/or object database 330, can generate new objects associated with their brand. The third parties can provide associated in-game effects similar to existing objects already stored within the object database 330. The third parties may also be allowed to provide additional in-game effects or bonuses that allow the third party generated objects to be superior in some manner thereby encouraging players to utilize the third party generated objects. In any case, the information that is submitted by the third parties can still be reviewed, for example by an administrator, before being stored within the object database 330 or used within the gaming network 320.

The autonomous agent database 340 is used to store information about each autonomous agent that is used within the gaming network 320. The information stored in the autonomous agent database 340 may include current characteristics, statistics, motivations, abilities and knowledge that the autonomous agent currently possesses within the game. Information about the origin of the autonomous agent (e.g., owner, first date of use, accomplishments) can also be stored in the autonomous agent database 340 associated with each respective autonomous agent. The autonomous agent database 340 can also store corresponding information about each autonomous agent based on the game the autonomous agent is participating in.

Each autonomous agent may be associated with a particular player (i.e. player profile/account) so that information about the player's available autonomous agent can be more easily retrieved. Furthermore, information about each autonomous agent can also be organized based on the game that the autonomous agent is used in. It may be possible that one autonomous agent owned by a player can be utilized in multiple different games simultaneously.

As players provide one or more objects to an autonomous agent within the gaming network 320, these objects influence how the particular autonomous agent behaves. These effects are stored in the autonomous agent database 340 for future reference. For example, if there is an issue with the gaming network 320 that requires the gaming network 320 to restart, the autonomous agent database 340 can recover the state of the autonomous agent from the autonomous agent database 340. Furthermore, as other objects are provided by the player to the same autonomous agent, the new effects that influence the autonomous agent can modify existing effects thereby requiring that the autonomous agent database 340 be updated accordingly.

In a further embodiment, the autonomous agent database 340 can also be used to store training-based information. The training-based information can be used in order to facilitate tutoring an autonomous agent by the user regarding how to perform an action within the gaming network 320. The user can provide as much or as little information as desired. For example, the user can provide step-by-step instructions to one or more autonomous agents in order to walk them through how to perform a task (i.e. cutting down a tree, picking fruit). In another embodiment, the user may provide general instructions as to what materials should be used to create a fire and allow the autonomous agent to create the fire using any method it currently knows using the provided materials.

In an example raised above, the user may provide tutoring regarding how one or more autonomous agents can cut down a tree. The example is provided as an illustration of how this feature of tutoring can be used between the user and the autonomous agents.

As one may know, there may be many different factors in how a tree can be cut down. For example, the user may be allowed to identify the type of equipment (i.e. ax, saw), the technique on how to cut down a tree (i.e. quick/small swings, slow/long swings), where to cut the tree, and which trees to cut. Identification of how to perform the act of cutting down the tree can be provided via explicit instructions. In another embodiment, the user may perform the action (e.g., tutorial video) whereby aspects of the action are extracted. The aspects of the action pertaining to the type of equipment used and the technique for cutting the tree down can similarly be provided to the autonomous agents for tutoring.

If applicable within the game, the autonomous agents tutored by the user (as described above) would carry out the tree cutting accordingly. For example, if a forest is present that includes numerous trees, the autonomous agent would select which trees to cut down as tutored. However, if only a few trees are available for cutting, this aspect of the tutoring may not be applicable. Furthermore, other factors (i.e. available equipment, number of autonomous agents available, time) may influence whether the autonomous agents would be able to carry out the tree cutting based on the tutoring received.

Furthermore, repeated tutoring sessions can be used to re-emphasize important aspects of actions that the user would like the autonomous agent to carry out. If the user repeatedly performs cutting of trees using a particular equipment and/or technique, autonomous agents may be more likely to use that same particular equipment and/or technique.

The tutoring can be usable to help the user educate the autonomous agents to perform various tasks, for example the tree cutting described above, to be more efficient (i.e. faster) or effective (i.e. prevention of deforestation).

In another example, the user may provide tutoring regarding how one or more autonomous agents can harvest fruits. The autonomous agent may be provided initial instructions to collect berries via an object such as a basket. Initially, an autonomous agent may randomly search and pick any berries nearby without much knowledge as to what is good/bad. Through tutoring, the user can instruct the autonomous agent to more efficiently and effectively perform this task of berry picking.

The user may monitor when the autonomous agents are out in the fields and provide feedback regarding the types of berries present (i.e. poisonous, non-poisonous) as well as factors to look out for when picking particular berries (e.g., ripeness, size, color). The user may also provide additional instructions such as how far the autonomous agents should look or how much to collect. This is to ensure, for example, that the autonomous agents are not overly burdened when transporting a load of berries back to a designated location (e.g., storehouse).

There may be many reasons by the user would like to instruct/tutor the autonomous agent to more effectively and efficiently pick berries. Picking poisonous berries can prove detrimental to the health and well-being of the autonomous agents if eaten/used. Picking non-ripe berries can greatly yield a lower harvest than expected (i.e. less available food for the autonomous agents to use). Furthermore, much like the deforestation issue raised in the tree-cutting scenario, picking all berries in an area may reduce (or eliminate) future yields of berries available for the autonomous agent.

The training-based information can also be provided a number of different ways (further details below) from the user. In one embodiment, the training-based information can be provided from the user via a graphical user interface. The graphical user interface can provide features regarding how an autonomous agent should carry out an action. For example, a user may identify particular material to use during the creation of fire, properties of a ripe fruit for harvest or technique for cutting down trees. The graphical user interface may provide a plurality of different options as well as "default" options that the autonomous agent is initially programmed with. Based on the situation arising in the network game 320, users may be allowed to tutor particular autonomous agents using these various options so that particular actions are performed more effectively or efficiently.

As noted above, the training-based information can be obtained directly from the user. Such information can be obtained from the user via a graphical user interface. The graphical user interface may include options that allow the user to input specific details (i.e. materials to use, frequency of performance) that the autonomous agent can implement when performing the task. In another embodiment, the tutoring can be obtained when the user directly controls the autonomous agent. While the user is directly controlling the autonomous agent during the performance of the task, the autonomous agent can continually monitor the user inputs in order to obtain and learn how the task should be performed. In this way, the autonomous agent can learn different aspects of the user's behavior when performing the task.

In another embodiment, video-based data may be obtained from the user performing an action (i.e. wood chopping) that a particular autonomous agent needs to perform within the network game 320. Using the example of the tree-chopping, a user can replicate how the autonomous agent should swing the ax in order to chop the tree. In one situation, the user may provide small, quick swings with an ax. In a different situation, the user may provide long, slow chops with an ax. In a further situation, the user may instruct the autonomous agent to pair up and perform the tree chopping with a saw instead. Information regarding how the tree-chopping can be performed can be extracted and forwarded to the autonomous agents for tutoring.

As described above, the process of providing direct (or intentional) instructions to the autonomous agent is associated with describing how the autonomous agent should perform an action. The user can specify various details regarding how the autonomous agent should perform the action thereby replicating the user within the game. It is also possible that during the process of providing direct instructions that one or more unconscious (or unintentional) instructions are also obtained from the user. These unconscious (or unintentional) instructions may be associated with subliminal behavioral preferences or actions that the user may automatically perform without being aware of them. For example, details regarding how the user walks, stands idly or holds an object can be extracted even if the user does not provide details associated with these aspects. Other details that the user may unintentionally provide but would still be picked up by the autonomous agent could also include timing, order and speed at which actions are performed. These details can also be further incorporated into the overall instructions to the autonomous agents so that the autonomous agents replicate further features belonging to the user.

Tutoring an autonomous agent by the user allows the user to customize how the autonomous agent behaves within the gaming network 320. Tasks within the gaming network 320 can be taught to be performed more efficiently or effectively. For example, users may tutor the autonomous agent regarding what materials to use to make a successful fire or properties of a ripe fruit for harvest. Furthermore, by allowing users to instruct and replicate how to perform actions (via intentional and unintentional instructions), an increase connection and attachment between the user and the autonomous agents can also be built.

After receiving the tutoring from the user, the autonomous agents will replicate the actions using the training-based information within the gaming network 320. As noted above, specific details (e.g., materials, technique, timing) are carried out based on the training-based information. In some situations, the autonomous agents will follow as much of the training-based information as possible. There may be situations where re-teaching the same action reinforces particular details of the action. For example, certain aspects (i.e. technique) may be further emphasized or modified based on subsequent tutoring sessions. In this way, the autonomous agents can be viewed as adaptive based on the tutoring sessions from the user regarding one or more tasks. Therefore, autonomous agents belonging to two different users may perform the same task differently.

Figure 4:
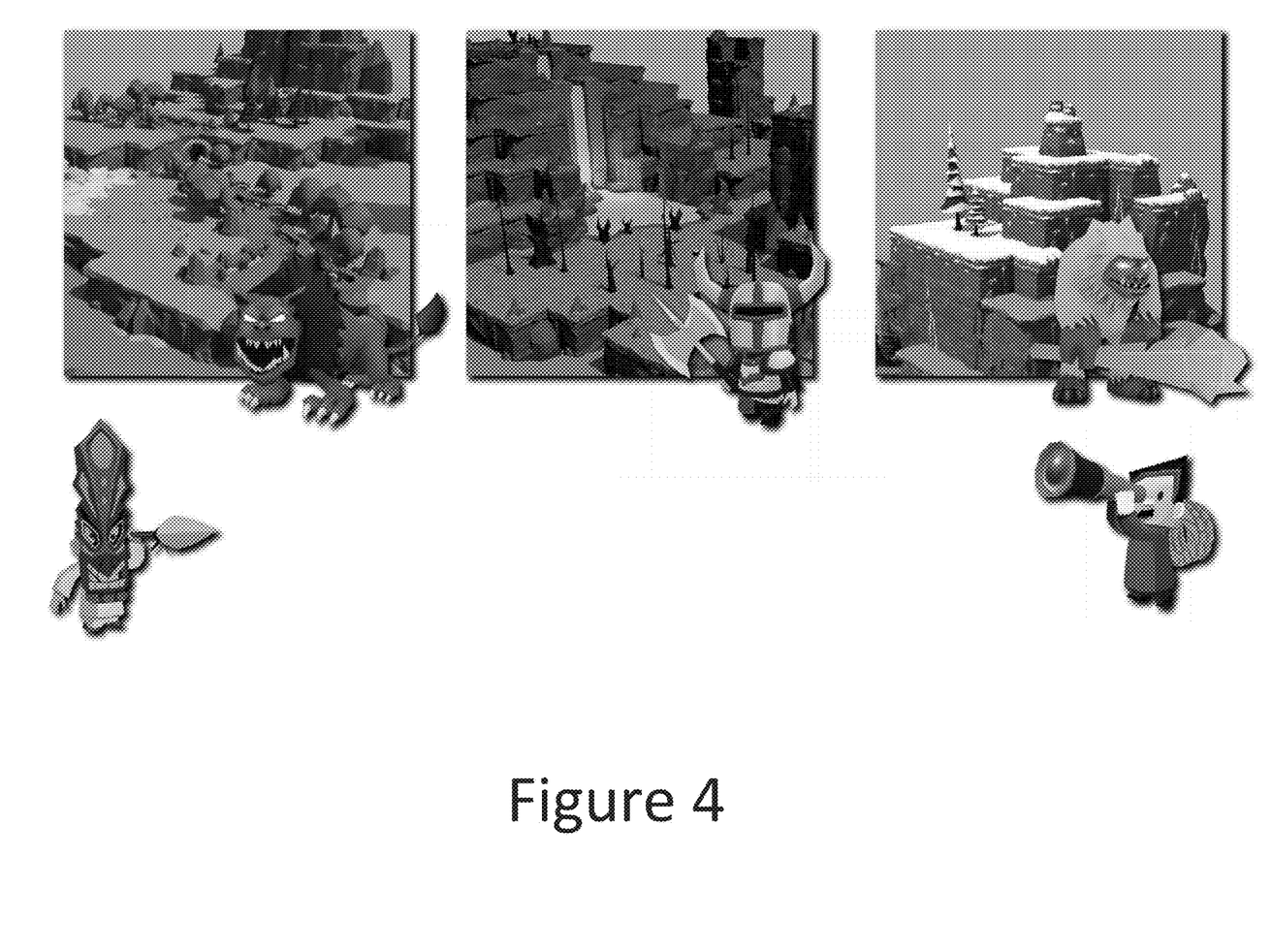

FIG. 4 illustrate example persistent environments that the autonomous agents can be used in along with characters that the autonomous agents may interact with. The persistent environments may exist on a dedicated server associated with the gaming network. In some embodiments, the persistent environment may exist in the cloud/Internet. The environment is considered persistent because the game will continue to run even when the player is not directly connected to the gaming network. In other words, all the autonomous agents (owned by the player or other players also participating in the gaming network) continue to perform tasks based on their motivations, characteristics and abilities bestowed to them via player provided objects.

Associated with each autonomous agent may be a database that is used to store information (i.e. knowledge) that has been acquired by an autonomous agent within the game. The knowledge that can be acquired by an autonomous agent, for example, may include discovery of new locations, resources and threats (i.e. dangerous wildlife) when encountered by the autonomous agent. Whenever an event that has occurred within game affects the autonomous agent, such event information may also be stored in the database associated with the autonomous agent.

Even though each of the autonomous agents owned by a particular player may be provided distinct objects, behave differently and experience different events, it may be possible (in an embodiment) that the knowledge acquired by each autonomous agent owned by one player is shared among all other autonomous agents owned by the same player. The knowledge associated by each autonomous agent may be stored within the same database, possibly assigned to a particular player. In this way, the collective knowledge can be recalled by all autonomous agents owned by the player. This sharing of knowledge may simulate the ability for communication to occur between all autonomous agents owned by the player.

In a further embodiment, the collective knowledge may also be shared between autonomous agents owned by two or more players. There may be situations where the game allows multiple players to form a group (i.e. guild, raid, party) where knowledge can be shared among players. The knowledge may include information obtained prior to the formation of the group. In some situations, the knowledge that is shared may only consist of information that has been acquired while the group is together.

As illustrated in the figure, the persistent environments that the autonomous agents exist and interact with can be varied. The persistent environment may contain numerous elements based on the design and desire of the game designer. For example, there may be grassy environments, barren environments and snow-based environments that can be occupied and explored by the autonomous agents. These persistent environments may also include non-player characters (or NPCs) that interact with the player's autonomous agents. These NPCs may be friendly or hostile. How the autonomous agents interact with the NPCs may be based on the respective objects that are provided to the autonomous agent.

In a further embodiment, it may be possible that one or more third parties would be capable of generating content that can be used within the gaming network. For example, a third party could design, develop and generate an environment that can be experienced by players using their autonomous agents. Presuming that the third parties have the ability to do so (e.g., permission by the game developer/gaming network), the third parties upload their generated third party content to the gaming network via application programming interfaces (API) that can be made available for third party developers by the game developer/gaming network.

With respect to the generated third party environments that are provided to the gaming network for use by the autonomous agents, the third parties would be capable of customizing how the autonomous agents interact with the environment. For example, the third parties can include various elements and events that the autonomous agents can interact with. With each element/event included in the generated third party environment, an embedded trigger condition can be included so that third-party content (e.g., text, events) may be processed and run when the trigger condition is fulfilled. For example, a trigger condition may exist that requires an autonomous agent to be in a particular area. Once the trigger condition is fulfilled, a hidden cave may appear. The third party content may include branded information (e.g., advertisements). For example, at particular times of the day (e.g., server time), fireworks can be provided that display the third party's brand logo.

Figure 5:
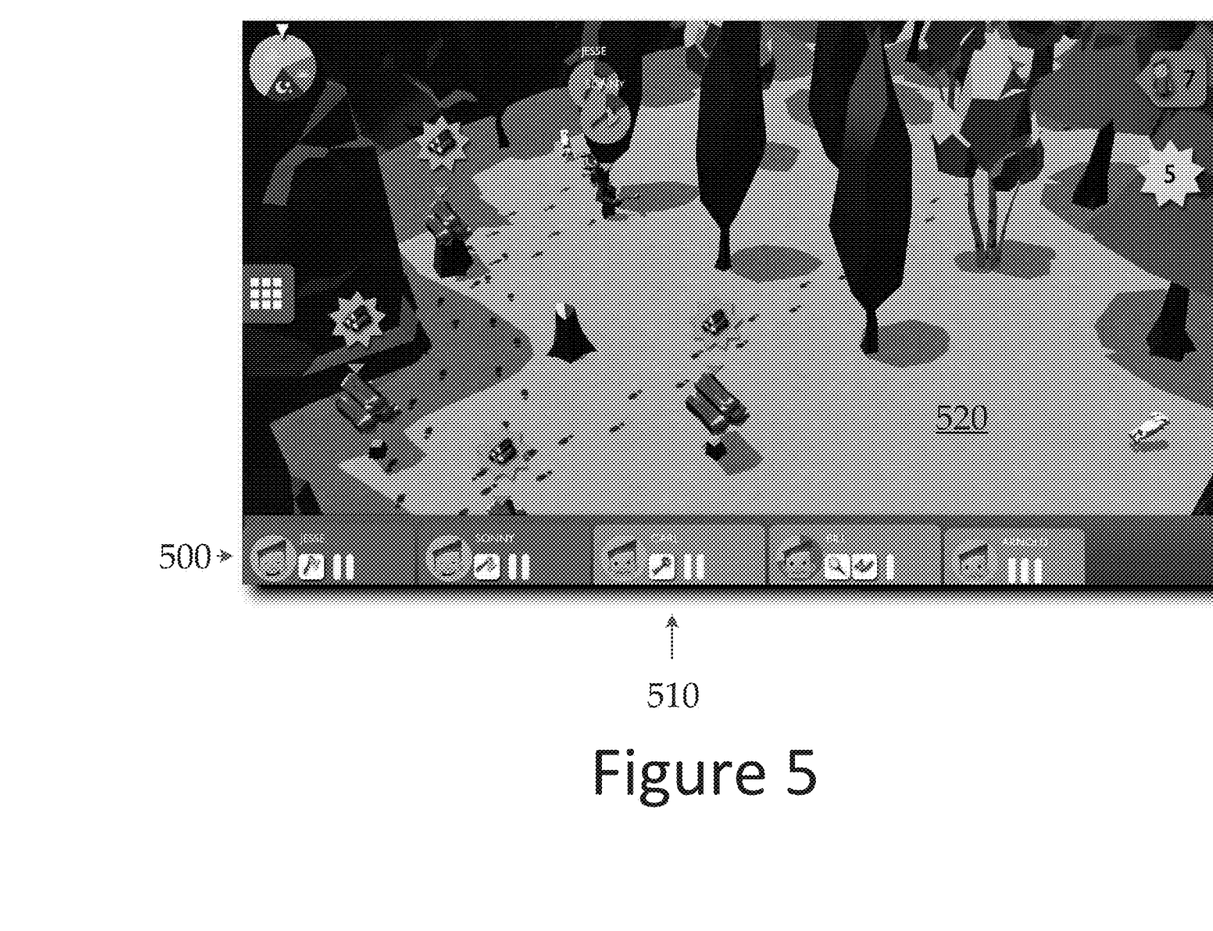
FIG. 5 illustrate example user interface.

FIG. 5 illustrate example user interface. The user interface may be displayed on the user device that allows the player to view what is occurring within the gaming network. The user interface may display, for example, all available autonomous agents 500 owned by the player, objects assigned to each autonomous agent 510 as well as an image of surrounding environments associated with one or more autonomous agents 520.

It should be noted that other elements known in the art may be included with the user interface. For example, other elements may include a clock or some reference to time (i.e. server time) and notifications that provide information about the current game state for the player to view such as current objectives that the autonomous agents can complete (i.e. collecting wood).

Figure 6:
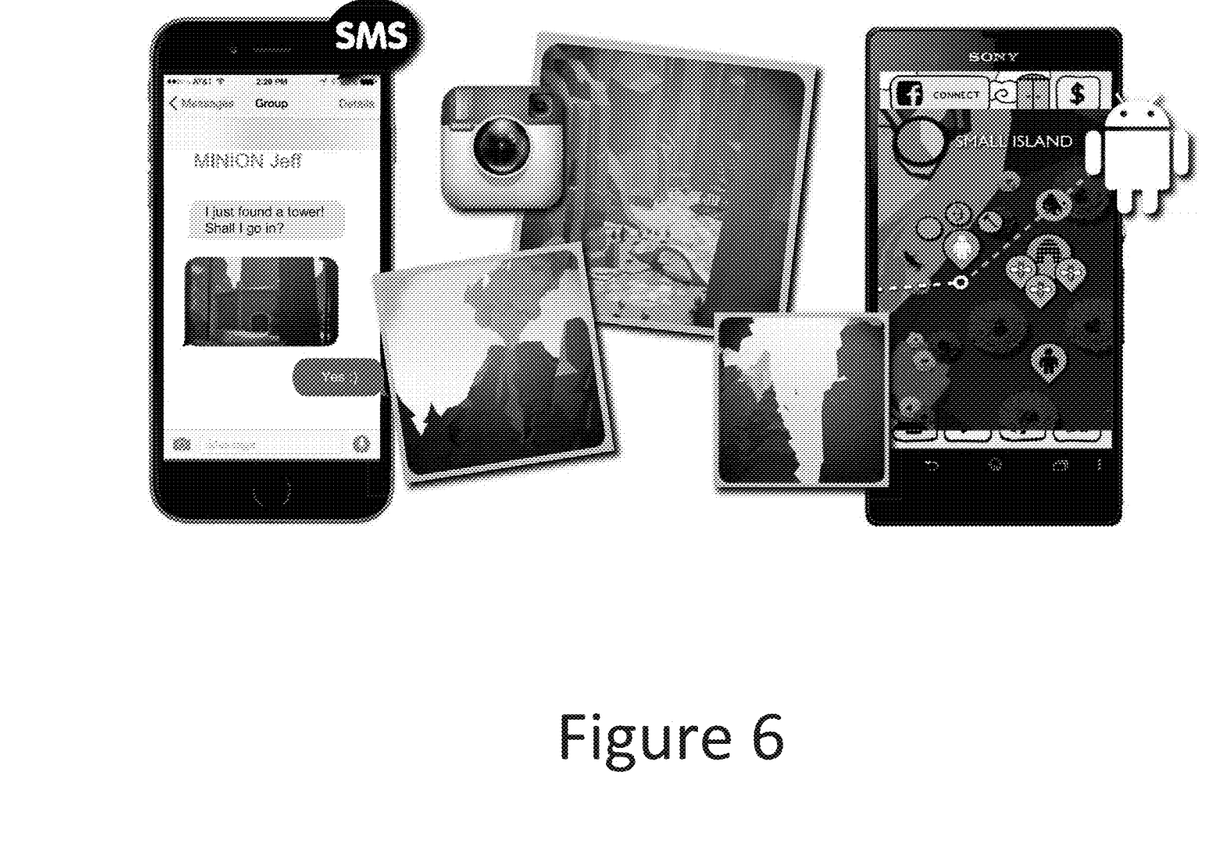
FIG. 6 illustrate an example embodiment whereby autonomous agents communicate to the player regarding events occurring within the game.

FIG. 6 illustrate an example embodiment whereby autonomous agents communicate to the player regarding events occurring within the game. In situations where the player may not be directly connected to the persistent environment/gaming network, the player can still obtain updates regarding the events occurring within the persistent environment/gaming network. These updates may also be triggered, for example, at particular times or locations associated with the game (e.g., the autonomous agent reaches a designated area or an event has occurred). In some cases, the updates may be provided on a regular basis (e.g., hourly). It may also be possible that the updates provided by the autonomous agent can be customized by the player to receive only updates that the player is interested in viewing.

These updates received by the player may come across as text-based notifications. The updates may include screen shots from within the game. The updates may be provided, for example, to the player's mobile device such as via an application running on their smartphone. In some embodiments, the updates can be provided as SMS/texts. Other methods may also include e-mails and social media (e.g., Facebook, Instagram).

In order to provide information to the player on their mobile device, the autonomous agent may require a particular object that is related to gathering information. Exemplary objects, possibly classified as record-based objects, may include pencils/pens and cameras. These record-based objects may provide autonomous agents within the gaming network the motivation and/or ability to write down summaries of events that have occurred that can be provided to the player via their smartphone. The record-based objects may also allow the autonomous agents the ability to draw or provide a snapshot representation of an event or discovery as well.

The in-game information provided by the autonomous agent may be processed by a natural language processing module that translates such information into speech (e.g., natural language of the player) that the player can understand. In some cases, such module may also translate the information so that it can also be properly displayed on the corresponding mobile device.

The natural language processing module is also provided so that user input from the mobile device can be translated into in-game commands that the autonomous agents may be capable of understanding. In an embodiment, the autonomous agent may provide an update to the player regarding a discovery of a new cave. The autonomous agent may be capable of providing the information to the user via a text and/or an accompanying image illustrating what the cave looks like. The autonomous agent may then request advice, such as, whether to explore the cave, what objects should be used, or whether to request help from other autonomous agents.

Based on the player input via their mobile device (i.e. SMS/text response), the autonomous agent may choose to perform various actions based on the available objects provided to the autonomous agent. For example, in response to advice as to whether the autonomous agent should explore the cave, if the autonomous agent does not have a light source, the autonomous agent may look for a light source so the cave can be explored. Alternatively, the autonomous agent may partner with or instruct another autonomous agent to explore the cave in its stead.

It may be possible, in other embodiments, that the ability to communicate between the autonomous agent and the player can be performed without requiring any particular object. However, the feature of allowing the autonomous agent to provide in-game updates to the player and subsequently receive player input via the player (e.g., text) would still be applicable here.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed:

1. A method for persistent autonomous agents, the method comprising:
   receiving, from a user, at least one object for a character within a network-based game, wherein the character has a set of character attributes that influence character actions within the network-based game, and wherein the received at least one object has one or more object-based attributes that modify one or more of the character attributes of the set of character attributes;
   updating the set of character attributes based on the received at least one object in accordance with the one or more object-based attributes;
   evaluating an impact of the received at least one object on the set of character attributes, wherein the evaluated impact identifies one or more of the character attributes that have been modified by the received at least one object;

generating instructions for the character within the network-based game based on the evaluated impact of the received at least one object on the updated plurality of character attributes; and executing the generated instructions to influence performance of subsequent character actions in accordance with the evaluated impact.

2. The method of claim 1, wherein the character receives two or more objects within the network-based game, wherein each received object has respective object-based attributes, and wherein the evaluating the impact on the set of character attributes that influence character actions is based on the received two or more objects.

3. The method of claim 1, wherein the one or more object-based attributes modify one or more of statistics, characteristics, motivations and abilities of the character within the network-based game.

4. The method of claim 1, wherein the evaluating the impact on the set of character attributes is also based on a length of time the received at least one object has been in possession of the character within the network-based game.

5. The method of claim 1, wherein the evaluating the impact on the set of character attributes is also based on a period of time associated with a use of the received at least one object by the character within the network-based game.

6. The method of claim 1, wherein the received at least one object is generated by third-parties.

7. The method of claim 6, wherein the received at least one object that is generated by third parties includes advertisement or brand information.

8. The method of claim 7, wherein the received at least one object that is generated by third parties possesses characteristics that have higher values compared to other similar objects that are usable within the network-based game.

9. A system for persistent autonomous agents, the system comprising:

a user device, wherein the user device is used by a user to interact with a character within a network-based game, wherein the interaction includes transmitting at least one object for the character within the network-based game; and a gaming server that manages the network-based game, wherein the gaming server:

receives, from the user device, the at least one object for the character within the network-based game, wherein the character has a set of character attributes that influence character actions within the network-based game, and wherein the received at least one object has one or more object-based attributes that modify one or more of the character attributes of the set of character attributes;

updates the set of character attributes based on the received at least one object in accordance with the one or more object-based attributes;

evaluates an impact of the received at least one object on the set of character attributes, wherein the evaluated impact identifies one or more of the character attributes that have been modified by the received at least one object;

generates instructions for the character within the network-based game based on the evaluated impact of the received at least one object on the updated plurality of character attributes; and executes the generated instructions to influence performance of subsequent character actions in accordance with the evaluated impact.

10. The system of claim 9, wherein the character receives two or more objects within the network-based game, wherein each received object has respective object-based attributes, and wherein the evaluating the impact on the set of character attributes that influence character actions is based on the received two or more objects.

11. The system of claim 9, wherein the one or more object-based attributes modify one or more of statistics, characteristics, motivations and abilities of the character within the network-based game.

12. The system of claim 9, wherein the evaluating the impact on the set of character attributes is also based on a length of time the received at least one object has been in possession of the character within the network-based game.

13. The system of claim 9, wherein the evaluating the impact on the set of character attributes is also based on a period of time associated with a use of the received at least one object by the character within the network-based game.

14. The system of claim 9, wherein the received at least one object is generated by third-parties.

15. The system of claim 14, wherein the received at least one object that is generated by third parties includes advertisement or brand information.

16. The system of claim 15, wherein the received at least one object that is generated by third parties possesses characteristics that have higher values compared to other similar objects that are usable within the network-based game.

* * * * *